Nov. 10, 1942.  R. F. HLAVATY  2,301,544
SELF-ALIGNING PULLEY
Original Filed Sept. 15, 1941
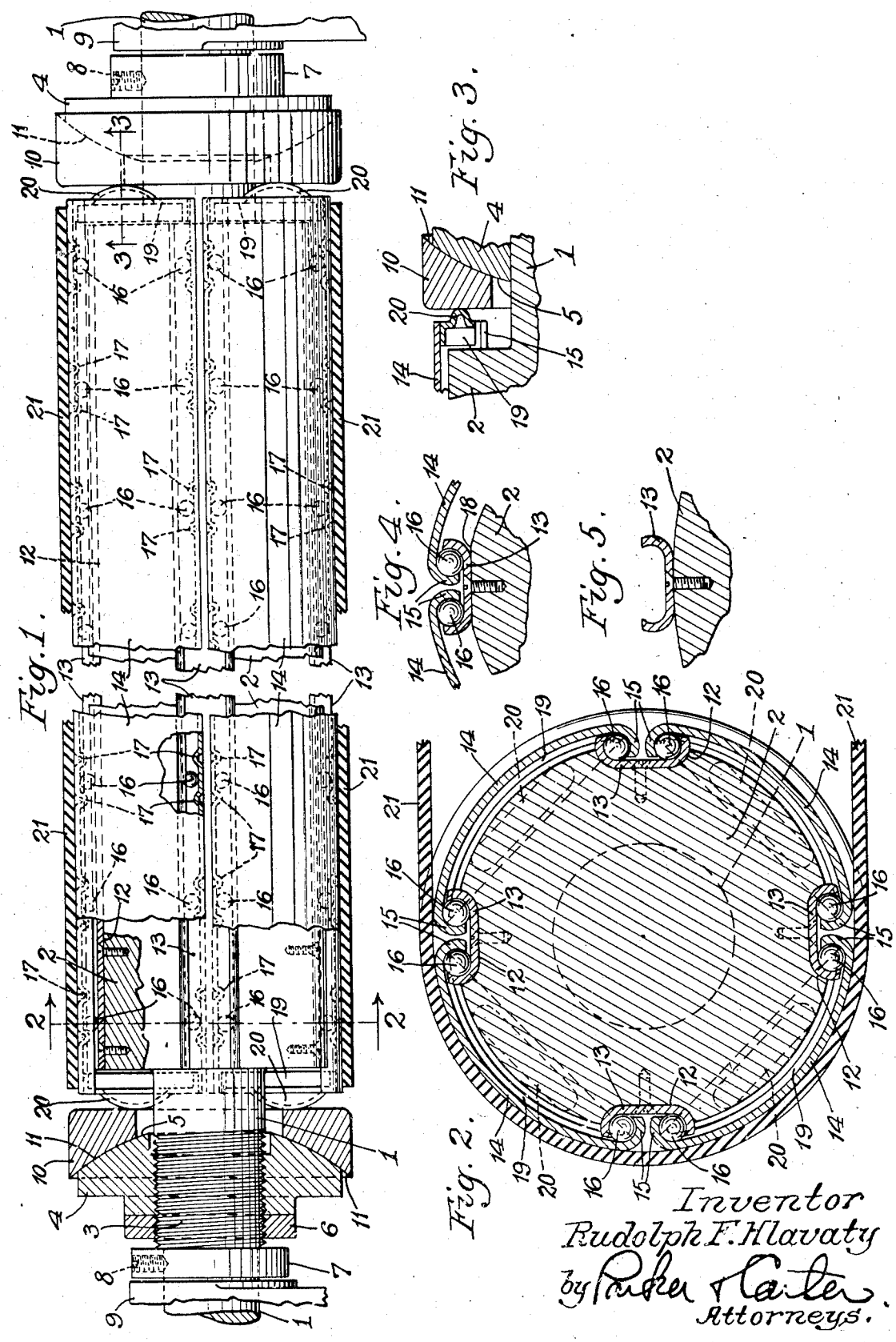
Inventor
Rudolph F. Hlavaty
by Parker & Carter
Attorneys.

Patented Nov. 10, 1942

2,301,544

UNITED STATES PATENT OFFICE 2,301,544

SELF-ALIGNING PULLEY

Rudolph F. Hlavaty, Cicero, Ill.

Original application September 15, 1941, Serial No. 410,871. Divided and this application January 26, 1942, Serial No. 428,271

15 Claims. (Cl. 74—241)

This invention relates to a self-aligning cylinder, wheel, roller, or other rotary member, either driving, driven, or idling. In one form it may be embodied in a pulley. It has for one object to provide a rotary member which has formed in it or adapted to it parts which operate automatically to keep it in alignment or to re-align it. Where the invention comprises a pulley operating with a belt, it serves to keep the belt and pulley aligned or to restore them to alignment.

It is well recognized that most belts and particularly wide or large belts have a tendency to move out of alignment. This tendency is particularly evident in the case of large rubber belts. Almost all belts are susceptible to change due to changing atmospheric and temperature conditions, and it is generally recognized that it is difficult to maintain such belts in alignment. In general practice, hand operated means are provided for re-aligning such belts, and frequent, if not constant, attention is required to maintain such belts properly aligned. It is one of the objects of this invention to obviate the necessity of any hand or manually controlled apparatus and to provide a belt pulley which is automatic and certain in its operation, and which automatically corrects and counteracts a tendency to misalignment.

Another object is to provide self-aligning means which act in response to side movement of the belt out of alignment; automatically to cause reverse side movement of the belt into the position of alignment.

Other objects will appear from time to time throughout the specification and claims.

The invention is illustrated more or less diagrammatically in the accompanying drawing, wherein:

Figure 1 is a longitudinal section of one form of the device with parts in elevation, parts broken away, and parts in section.

Figure 2 is a transverse section taken on an enlarged scale at line 2—2 of Figure 1.

Figure 3 is a sectional detail taken at line 3—3 of Figure 1.

Figure 4 is a sectional detail illustrating a modified form of engaging means or groove construction.

Figure 5 is very similar to Figure 4, illustrating a still further modification.

Like parts are indicated by like characters throughout the specification and the drawing.

As shown in the figures generally, 1 is a shaft member which has a generally rounded enlarged portion 2. These parts may be integral with each other or they may be made separately and attached together. The portion 1 is preferably threaded at 3 to receive a member 4 which has a convex portion or surface 5 and is adjustably positioned on the threaded portion being held in place in adjusted position thereon by a lock nut 6 or otherwise. A spacing ring 7 may be removably positioned on the shaft 1 and held in place thereon by a set screw 8. The shaft 1 is supported in bearings 9, the details of which are not illustrated, since the invention is not limited to any particular form of bearing or bearing support.

A loose ring-like member 10 is positioned freely about the shaft 1 and adjacent each of the members 4. It is provided with a concave face 11 which contacts the convex face 5 of the member 4. The construction thus far described is preferably identical at each end of the pulley.

The rounded or enlarged portion 2 of the pulley may be grooved as at 12 to receive a channel or groove member 13. Preferably four such grooves 12 will be formed, and they will be spaced equally about the member 2. Should more than four be formed, they would ordinarily be equally spaced, and each of the grooves will preferably receive a channel member. The edges of each channel member 13 are upwardly and somewhat inwardly curved, as shown in Figure 2 particularly.

Arcuate surface members 14 are provided with inturned edges 15 to engage balls 16, which are positioned at suitable intervals on both sides of the channel members 13. As shown in Figure 1 the inturned edges 15 of the members 14 are provided with pairs of depressions 17 which form limits for the balls and prevent their moving out of proper positions of adjustment. There may be any desired number of pairs of depressions 17 to receive and space the balls 16.

As shown in Figure 4 the channel member 13, instead of being positioned in a groove or depression 12 in the member 2 is positioned upon a flattened portion 18 on the member 2. Such a construction is particularly useful where the diameter of the member 2 is such that a channel member may be readily secured to the surface and may be received without the necessity of forming a groove into which it may fit.

As shown in Figure 5 the member 2 is considered as being of such diameter that the channel member 13 may be secured directly to its face without even the necessity of flattening the face of the member 2 at the point of attachment, and this construction is advantageous for pulleys of large diameter. The bottom of the channel 13 may in the form of Figure 5 be slightly curved to conform to the outer face of the member 2.

As a means for closing the ends of the arcuate pulley surface members 14 closure plates 19 are inserted one in each open end of each member 14. These closure plates may be sprung into place or welded in place or otherwise secured, and each of them has preferably a rounded cam-like portion 20 extending outwardly from it. This cam portion is rounded horizontally and vertically—that is to say, it is rounded in two directions and bears against the straight or flat face of the member 10.

21 is a belt which may be of any type. It may be a conveyor or a belt proper, and may be made of any desirable material. The pulley may also be associated with any surface member with which it is in contact, whether that member be a belt, a conveyor, or something else.

It will be realized that whereas I have described and shown a practical and operative embodiment of my invention and the method for carrying it out, nevertheless many changes may be made in the size, shape, number and disposition of parts and in the details and steps of such method without departing from the spirit of my invention. I therefore wish my description and drawing to be taken as in a broad sense illustrative or diagrammatic, rather than as limiting me to my precise showing.

The use and operation of the invention are as follows:

The pulley of the various figures may be associated with a belt or any other member with which it is in contact, and it may be driven or may idle. The member with which the pulley surface is in contact may become misaligned, and should that occur, the mechanism of the invention corrects that misalignment automatically in response to its occurrence.

The parts are shown properly aligned in Figure 1. Should the belt become misaligned, for example should it move to the left with respect to the pulley, its left edge will contact the wedge ring 10 and will probably climb up on it. When that occurs the upper edge of the wedge ring 10 is depressed, and the ring moves downwardly about the convex face of the member 4. When it does that it effects a wedge action on the uppermost surface member 14 through its rounded portion 20. Thus when belt misalignment occurs to the left, it causes the wedge ring to act so that it drives or forces the uppermost pulley surface member 14 to the right, thus tending to carry the belt back to the right in a direction opposite to that in which misalignment has occurred.

The construction of the wedge rings and associated parts is preferably identical at both ends of the pulley assembly. Therefore when the downward movement of the left-hand wedge ring 10 has caused the uppermost surface member 14 to move the right, that effects a thrust upon the right-hand wedge ring 10 and causes it to be forced upwardly about its convex member 4. As that occurs the upper edge of the right-hand ring 10 moves to the right and the lower edge of the ring correspondingly moves to the left, effecting thrust a thrust upon the lowermost pulley surface member 14 and carrying it to the left.

As a result of the movement above described, the misalignment of the belt has itself caused two oppositely placed pulley surface members to shift axially along the pulley or shaft portion 2, and it has shifted the uppermost pulley member 14 to the right. Since this pulley member is the one against which the greatest load of the belt is pulling it carries the belt bodily to the right with it and thus tends to correct misalignment. This effect is continued or may be continued as the pulley revolves and should the belt move too for to the right, the same cycle of operations would occur, but with the directions reversed so that the outermost or uppermost pulley member 14, should the belt move too far to the right, will be forced to the left and will carry the belt back.

The pulley surface members are assembled on the body 2 as shown and are held in place by the cooperation between the edges 15 of the members 14, and the balls 16 and the edges of the member 13. In assembling the form of Figure 2 the body member 2 is provided with grooves 12 into which the channel members 13 are placed. These members are secured in place by screws, as shown or in any other desired manner. The surface members are then slipped longitudinally into place, balls being positioned between each pair of limiting members 17 as the surface members are slid or slipped into place. Thus the anti-friction members themselves which permit free axial movement serve as securing members to hold the member 14 in place.

The method of assembly is substantially the same in the forms of Figures 4 and 5 as that just described, except that in the form of Figure 4 the body member 2, instead of being grooved is flattened as at 18, and the channel members 13 are secured by screws or otherwise to the flattened portions.

In the form of Figure 5 the diameter of the body 2 is such that neither grooving nor flattening is necessary and the members 13 are merely secured directly to the outer surface of the member 2.

This application is a division of my copending application, Serial No. 410,871, filed September 15, 1941.

I claim:

1. In combination in a pulley adapted to contact a belt, a main pulley body, a plurality of channel members secured longitudinally to said body, and a plurality of belt contacting surface members, said surface members being movably positioned on said body and provided with edges extending into said channel members, and members positioned within said channels, and within the edges of said surface members, said members serving to lock said surface members against radial movement away from said body, while holding them free for longitudinal movement with respect to said body.

2. In combination in a pulley adapted to contact a belt, a main pulley body, a plurality of channel members secured longitudinally to said body, and a plurality of belt contacting surface members, said surface members being movably positioned on said body and provided with edges extending into said channel members, and anti-friction members positioned within said channels, and within the edges of said surface members, said anti-friction members serving to lock said surface members against radial movement away from said body, while holding them free for longitudinal movement with respect to said body.

3. In combination in a pulley adapted to contact a belt, a main pulley body, comprising a generally rounded member, said body member being elongated, a plurality of channel members secured longitudinally to said body, and a plurality of belt contacting surface members, said surface members being movably positioned on said body and provided with edges extending into said channel members, and members positioned within said channels, and within the edges of said surface members, said members serving to lock said surface members against radial movement away from said body, while holding them free for longitudinal movement with respect to said body.

4. In combination in a pulley adapted to contact a belt, a main pulley body, a plurality of channel members secured longitudinally to said body, and a plurality of belt contacting surface members, said surface members being generally arcuate in shape, said surface members being movably positioned on said body and provided with edges extending into said channel members, and members positioned within said channels, and within the edges of said surface members, said members serving to lock said surface members against radial movement away from said body, while holding them free for longitudinal movement with respect to said body.

5. In combination in a pulley adapted to contact a belt, a main pulley body, a plurality of channel members secured longitudinally to said body, and a plurality of belt contacting surface members, said surface members being generally arcuate in shape, said surface members being movably positioned on said body and provided with in-turned edges extending into said channel members, and members positioned within said channels, and within the edges of said surface members, said members serving to lock said surface members against radial movement away from said body, while holding them free for longitudinal movement with respect to said body.

6. In combination in a pulley adapted to contact a belt, a main pulley body, a plurality of channel members secured longitudinally to said body, and a plurality of belt contacting surface members, said surface members being generally arcuate in shape, said surface members being movably positioned on said body members and provided with in-turned edges extending into said channel members, and anti-friction members positioned within said channels, and within the edges of said surface members, said anti-friction members serving to lock said surface members against radial movement away from said body, while holding them free for longitudinal movement with respect to said body.

7. In combination in a pulley adapted to contact a belt, a main pulley body, a plurality of channel members secured longitudinally to said body, and a plurality of belt contacting surface members, said surface members being generally arcuate in shape, said surface members being movably positioned on said body and provided with in-turned edges extending into said channel members, and anti-friction members positioned within said channels, and within the in-turned edges of said surface members, said anti-friction members serving to lock said surface members against radial movement away from said body, while holding them free for longitudinal movement with respect to said body.

8. In combination in a pulley adapted to contact a belt, a main pulley body comprising a pair of shaft-like portions adapted to be supported for rotation in bearings, a plurality of channel members secured longitudinally to said body, and a plurality of belt contacting surface members, said surface members being generally arcuate in shape, said surface members being movably positioned on said body and provided with in-turned edges extending into said channel members, and anti-friction members positioned within said channels, and within the in-turned edges of said surface members, said anti-friction members serving to lock said surface members against radial movement away from said body, while holding them free for longitudinal movement with respect to said body.

9. In combination in a pulley adapted to contact a belt, a main pulley body comprising a generally rounded member, said body member being elongated, and a pair of shaft-like portions adapted to be supported for rotation in bearings, a plurality of channel members secured longitudinally to said body, and a plurality of belt contacting surface members, said surface members being generally arcuate in shape, said surface members being movably positioned on said body and provided with in-turned edges extending into said channel members, and anti-friction members positioned within said channels, and within the in-turned edges of said surface members, said anti-friction members serving to lock said surface members against radial movement away from said body, while holding them free for longitudinal movement with respect to said body.

10. In combination in a pulley adapted to contact a belt, a main pulley body, a plurality of channel members secured longitudinally to said body, and a plurality of belt contacting surface members, said surface members being movably positioned on said body and provided with edges extending into said channel members, and members positioned within said channels, and within the edges of said surface members, said members serving to lock said surface members against radial movement away from said body, while holding them free for longitudinal movement with respect to said body, and a pair of concave wedge members, fixed with respect to said body and positioned one at each end thereof, and a pair of movable wedge members mounted about said body, one in contact with each of said fixed wedge members and in contact with the ends of said surface members.

11. In combination in a pulley adapted to contact a belt, a main pulley body, a plurality of channel members secured longitudinally to said body, and a plurality of belt contacting surface members, said surface members being generally arcuate in shape, said surface members being movably positioned on said body and provided with in-turned edges extending into said channel members, and members positioned within said channels, and within the edges of said surface members, said members serving to lock said surface members against radial movement away from said body, while holding them free for longitudinal movement with respect to said body, and a pair of concave wedge members, fixed with respect to said body and positioned one at each end thereof, and a pair of movable wedge members mounted about said body, one in contact with each of said fixed wedge members and in contact with the ends of said surface members.

12. In combination in a pulley adapted to contact a belt, a main pulley body comprising a generally rounded member, said body member being elongated, and a pair of shaft-like portions adapted to be supported for rotation in bearings, a plurality of channel members secured longitudinally to said body, and a plurality of belt contacting surface members, said surface mem-
bers being generally arcuate in shape, said surface members being movably positioned on said body and provided with in-turned edges extending into said channel members, and anti-friction members positioned within said channels, and within the in-turned edges of said surface members, said anti-friction members serving to lock said surface members against radial movement away from said body, while holding them free for longitudinal movement with respect to said body, and a pair of concave wedge members, fixed with respect to said body and positioned one at each end thereof, and a pair of movable wedge members mounted about said body, one in contact with each of said fixed wedge members and in contact with the ends of said surface members.

13. In combination in a pulley adapted to contact a belt, a main pulley body, a plurality of channel members secured longitudinally to said body, and a plurality of belt contacting surface members, said surface members being movably positioned on said body and provided with edges extending into said channel members, and members positioned within said channels, and within the edges of said surface members, said members serving to lock said surface members against radial movement away from said body, while holding them free for longitudinal movement with respect to said body, and a pair of concave wedge members, fixed with respect to said body and positioned one at each end thereof, and a pair of movable wedge members mounted about said body, one in contact with each of said fixed wedge members and in contact with the ends of said surface members, said surface members being each provided at each of its ends with a rounded projection adapted to contact said movable wedge members.

14. In combination in a pulley adapted to contact a belt, a main pulley body, a plurality of channel members secured longitudinally to said body, and a plurality of belt contacting surface members, said surface members being generally arcuate in shape, said surface members being movably positioned on said body and provided with in-turned edges extending into said channel members, and members positioned within said channels, and within the edges of said surface members, said members serving to lock said surface members against radial movement away from said body, while holding them free for longitudinal movement with respect to said body, and a pair of concave wedge members, fixed with respect to said body and positioned one at each end thereof, and a pair of movable wedge members mounted about said body, one in contact with each of said fixed wedge members and in contact with the ends of said surface members, said surface members being each provided at each of its ends with a rounded projection adapted to contact said movable wedge members.

15. In combination in a pulley adapted to contact a belt, a main pulley body comprising a generally rounded member, said body member being elongated, and a pair of shaft-like portions adapted to be supported for rotation in bearings, a plurality of channel members secured longitudinally to said body, and a plurality of belt contacting surface members, said surface members being generally arcuate in shape, said surface members being movably positioned on said body and provided with in-turned edges extending into said channel members, and anti-friction members positioned within said channels, and within the in-turned edges of said surface members, said anti-friction members serving to lock said surface members against radial movement away from said body, while holding them free for longitudinal movement with respect to said body, and a pair of concave wedge members, fixed with respect to said body and positioned one at each end thereof, and a pair of movable wedge members mounted about said body, one in contact with each of said fixed wedge members and in contact with the ends of said surface members, said surface members being each provided at each of its ends with a rounded projection adapted to contact said movable wedge members.

RUDOLPH F. HLAVATY.